(12) United States Patent
Melekian

(10) Patent No.: US 7,000,743 B2
(45) Date of Patent: Feb. 21, 2006

(54) BRAKE SHOE ASSEMBLY HAVING A CORROSION REDUCING LINING

(75) Inventor: Joseph Melekian, Rochester Hills, MI (US)

(73) Assignee: Meritor Heavy Vehicle Technology LLC, Troy, MI (US)

( * ) Notice: Subject to any disclaimer, the term of this patent is extended or adjusted under 35 U.S.C. 154(b) by 652 days.

(21) Appl. No.: 10/056,156

(22) Filed: Jan. 24, 2002

(65) Prior Publication Data

US 2003/0136619 A1 Jul. 24, 2003

(51) Int. Cl.
F16D 51/16 (2006.01)

(52) U.S. Cl. .............................. 188/250 B; 188/264 R
(58) Field of Classification Search ............ 188/250 B, 188/264 R, 264 B–264 W
See application file for complete search history.

(56) References Cited

U.S. PATENT DOCUMENTS

| | | | | |
|---|---|---|---|---|
| 2,851,132 A | * | 9/1958 | James ..................... | 188/264 R |
| 2,875,859 A | * | 3/1959 | Strebinger .............. | 188/264 R |
| 2,966,241 A | * | 12/1960 | Martin .................... | 188/264 D |
| 3,101,533 A | * | 8/1963 | Rossbach ................ | 188/264 R |
| 3,862,675 A | * | 1/1975 | Blatter et al. ........... | 188/181 R |
| 5,238,091 A | * | 8/1993 | Nakagawa et al. ...... | 188/77 W |
| 5,261,512 A | * | 11/1993 | Young .................... | 188/250 B |
| 5,791,443 A | * | 8/1998 | Manz ..................... | 188/250 B |
| 5,816,370 A | | 10/1998 | Verbeeten et al. | |
| 5,836,428 A | | 11/1998 | Young | |
| 5,957,250 A | | 9/1999 | Redgrave et al. | |
| 5,975,253 A | * | 11/1999 | Umezawa et al. ........ | 188/77 R |
| 6,108,889 A | | 8/2000 | Ruhe | |
| 6,196,360 B1 | | 3/2001 | Iizuka et al. | |
| 6,236,310 B1 | | 5/2001 | Kramer et al. | |
| 6,237,834 B1 | | 5/2001 | Mahoney et al. | |

* cited by examiner

*Primary Examiner*—Robert A. Siconolfi
(74) *Attorney, Agent, or Firm*—Carlson, Gaskey & Olds

(57) ABSTRACT

A brake shoe assembly provides a plurality of drain openings located through a brake shoe table which correspond with drain openings in a brake lining. The aligned drain openings provide an unobstructed moisture escape path from an inner surface of the brake shoe table to minimize moisture retention and the possibility of corrosion.

11 Claims, 3 Drawing Sheets

US 7,000,743 B2

BRAKE SHOE ASSEMBLY HAVING A CORROSION REDUCING LINING

BACKGROUND OF THE INVENTION

The present invention relates to a brake shoe assembly, and more particularly to a plurality of radial apertures which provide a moisture escape path.

Most vehicles include a brake system having a set of brake shoe assemblies for retarding the rotation of the wheels of the vehicle when the brakes are applied. Typically, each brake shoe assembly includes a brake lining made of a friction material mounted to a support or brake shoe table. The brake lining gradually wears away during brake applications. After numerous brake applications, the brake lining wears below a critical material thickness and, therefore, should be replaced. As a result, the brake linings are separate components which are removably mounted to the brake shoe table. Dissimilar materials and face to face mounting may result in moisture retention, corrosion, and possible brake lining fracture.

Accordingly, it is desirable to provide brake shoe assemblies which minimize moisture retention and the possibility of corrosion.

SUMMARY OF THE INVENTION

The brake shoe assemblies according to the present invention provide a plurality of drain openings located through a brake shoe table which correspond with drain openings in a brake lining. As the brake linings are removably attached to the brake shoe table, alignment of the drain openings is inherently provided. The drain openings provide an unobstructed moisture escape path from the concave brake shoe table inner surface such as within a trough between support struts to thereby minimize moisture retention and the possibility of corrosion.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
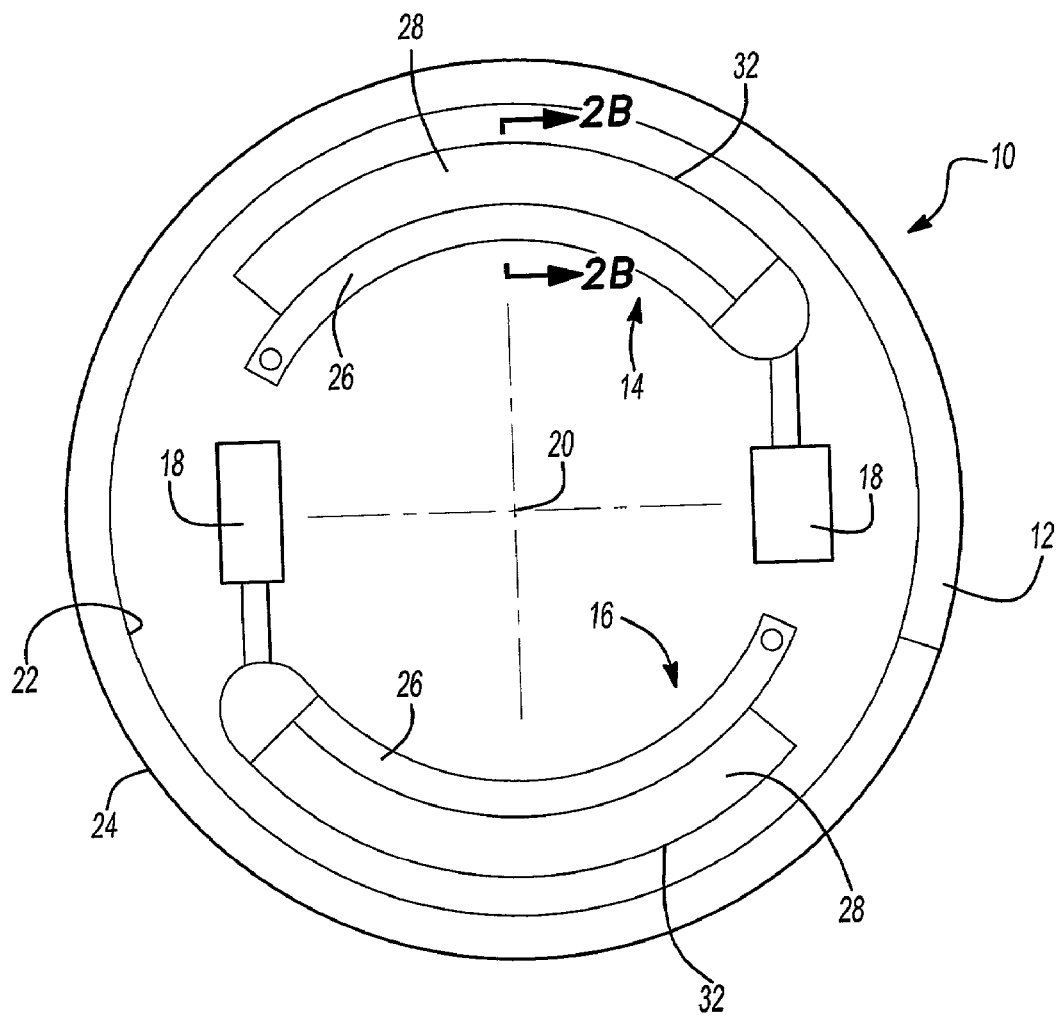
FIG. 1 is a schematic view an exemplary drum brake system designed according to the present invention.

FIG. 1 illustrates a general schematic view of a drum brake system 10. The drum brake system 10 includes a cylindrical brake drum 12, a first and second brake shoe assembly generally shown at 14,16 and an actuator 18. The general operation of the brake drum assembly 10 is known. The drum brake system 10 can be of various types of systems such as an s-cam brake, a wedge brake, or a drum brake actuated by a hydraulic cylinder. The actuator 18, shown schematically in FIG. 1, represents any known actuating mechanism for drum brake systems such as a cam mechanism, a wedge mechanism, or a hydraulic cylinder. The actuator 18 moves the first and second brake shoe assemblies 14, 16 into contact with the rotating brake drum 12 and can be controlled hydraulically or pneumatically. Also, as known, a single actuator could move both the first and second brake shoe assemblies 14, 16 into contact with the rotating brake drum 12.

The brake drum 12, which rotates about an axis of rotation 20, has an inner surface 22 and an outer surface 24. The brake shoe assemblies 14, 16 are located adjacent to the inner surface 22 of the brake drum 12. Each brake shoe assembly 14, 16 include a brake lining 26 of a known friction material supported upon an arcuate brake shoe table 28. Each brake lining 26 presents a wear surface 32 which contacts the inner surface 22 of the rotating brake drum 12 when the actuator 18 moves the first and second brake shoe assemblies 14 and 16 against the brake drum 12.

Figures 2A, 2B:
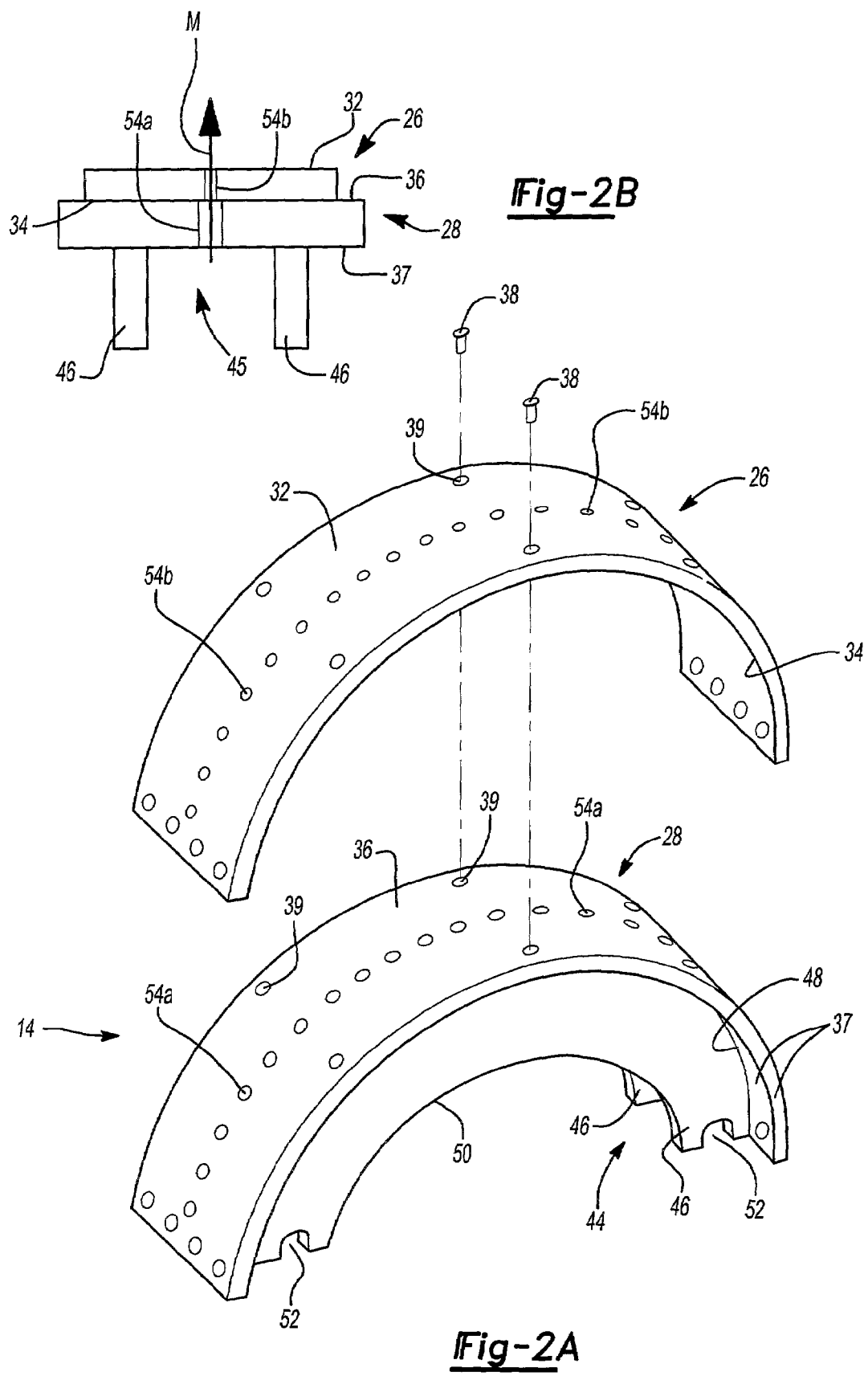
FIG. 2A is an exploded perspective view of a brake shoe assembly according to the present invention.
FIG. 2B is a sectional view of the brake assembly taken along line 2B—2B in FIG. 1.
Figure 3:
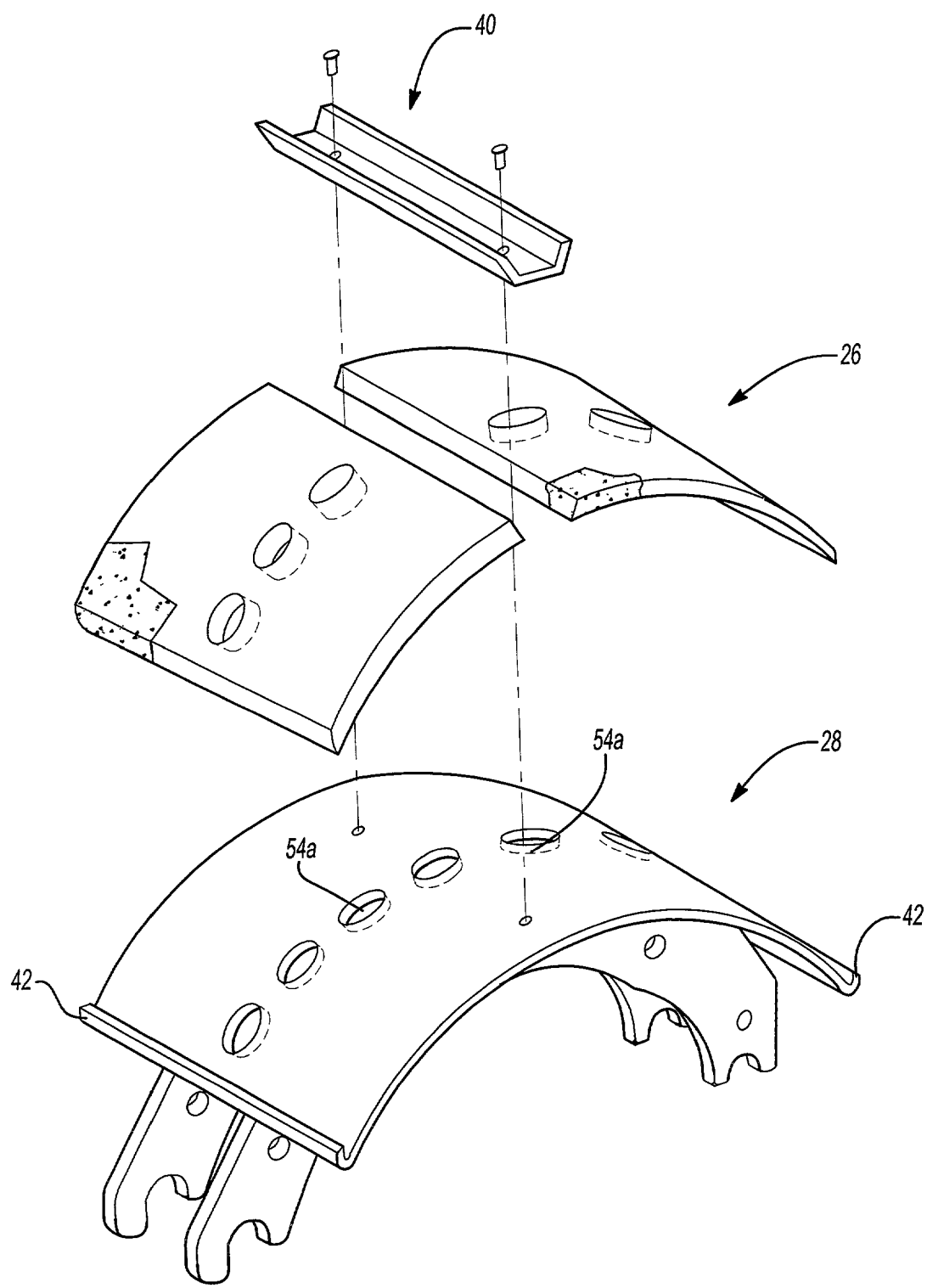
FIG. 3 is an exploded perspective view of another brake shoe assembly according to the present invention.

Referring to FIG. 2A, one of the first and second brake shoe assemblies 14, 16 is illustrated, and although the first brake shoe assembly 14 is referred to, such description applies equally to the second brake shoe assembly 16. The brake shoe assembly 14 includes the arcuate brake shoe table 28 and the brake lining 26. Each brake lining 26 includes an interface surface 34 which contacts the brake shoe table 28 along a convex brake shoe table outer surface 36. Preferably, fasteners 38 such as rivets or the like removably attach the brake lining 26 to the brake shoe table 28 thereby providing for replacement of the brake lining 26 once consumed. The fasteners 38 are typically mounted within apertures 39. It should be understood that although a particular fastener arrangement is illustrated in the disclosed embodiment, other attachments will also benefit from the present invention such as a central wedge 40 and flanges 42 (FIG. 3).

A concave brake shoe table inner surface 37 of the arcuate brake shoe table 28 is mounted to a similarly curved web 44. The web 44 typically includes a pair of arcuate struts 46 (FIG. 2B), although it should be understood that a single strut may also be provided to form the web.

The struts 46 are preferably formed of a high strength metal such as steel and include an outer convex edge 48 and an inner concave edge 50. Notches 52 or the like may be formed into the struts 46 for engagement with an anchor pin and roller (not shown) of the drum brake system 10 (FIG. 1) as generally known.

The brake shoe table 28 is mounted to the outer convex edge 48 of the struts 46 by welding or the like. The brake shoe table 28 is thereby supported by the web 44. Although illustrated in a schematic and somewhat exaggerated form in FIG. 1, the first and second brake shoe assemblies 14, 16 and the actuators 18 are relatively closely spaced together. Moisture caused from water, snow, mud, ice, de-icing chemical compounds, etc., heretofore have tended to collect within a concave trough 45 between the struts 46 and between the brake lining 26 and arcuate brake shoe table 28. Moisture typically cannot drain from within the trough 45 (FIG. 2B) as the end of the trough 45 are commonly plugged by road debris, grease and the like. The trapped moisture may tend to corrode the web 44, the brake shoe table 28 and the convex brake shoe table outer surface 36. Such corrosion may also lift the fasteners 38 and cause "jacking" of the linings which may eventually lead to cracking. Rust "jacking" is the process where by lining blocks crack due to the formation of an oxide rust layer between the bottom of the lining block and the top of the brake shoe table surface that tends to raise the block off the shoe. Since the rivets hold the block tightly to the table the result is cracks in the block near the rivets.

A plurality of drain openings 54*a* are located through the brake shoe table 28 which correspond with drain openings 54*b* in the linings 26. The drain openings 54*a*, 54*b* are located radially about the axis of rotation 20 and are preferably located along a length of the brake shoe table 28 and between the struts 46, however, other arrangements will also benefit from the present invention.

As the brake linings 26 are removably attached to the brake shoe table 28, alignment of the drain openings is inherently provided. That is, as apertures 39 for fasteners 38 must be in line, an affixed relationship between brake shoe table 28 and lining 26 is provided. The drain openings 54*a*, 54*b* thereby provide an unobstructed moisture escape path (illustrated schematically by arrows in FIG. 2B) from the concave brake shoe table inner surface 37, such as within the trough 45, to thereby minimize moisture retention and the possibility of corrosion and "jacking". As a plurality of drain openings 54*a*, 54*b* are provided possible blockage of one or more does not greatly diminish the escape path. It should be further understood that the drain opening 54*a*, 54*b* may not be in perfect alignment so long as a moisture escape path is defined.

The drain openings 54*a*, 54*b* are not limited to circular openings and alternatively of additionally include slots 54*a*', 54*b*' (FIG. 3) or the like. Moreover, the drain openings 54*a* may be of a different configuration than drain openings 54*b*. The drain openings 54*a*, 54*b* also provide a weight reduction and additional cooling paths while only slightly decreasing the brake lining wear surface 32. Moreover, the drain openings 54*a*, 54*b* by providing circulatory airflow therethrough, moisture which may not drain is more readily evaporated to further minimize moisture retention and the possibility of corrosion and "jacking".

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A brake shoe assembly comprising:
   an arcuate brake shoe table defining a plurality of brake shoe table drain openings therethrough;
   a brake lining matable with said arcuate brake shoe table, said brake lining material defining a plurality of brake lining drain openings therethrough, at least one of said plurality of brake lining drain openings aligned with one of said plurality of brake shoe table drain openings to provide an unobstructed moisture escape path; and
   a pair of struts attached to said concave brake shoe table inner surface which define a concave trough therebetween, said plurality of brake shoe table drain openings located in communication with said concave trough.

2. The brake shoe assembly as recited in claim 1, wherein each of said plurality of brake shoe table drain openings and said plurality of brake lining drain openings are circular.

3. The brake shoe assembly as recited in claim 1, wherein each said plurality of brake shoe table drain openings and said plurality of brake lining drain openings are elongated.

4. A brake shoe assembly comprising:
   an arcuate brake shoe table defining a concave brake shoe table inner surface, a convex brake shoe table outer surface and a plurality of brake shoe table drain openings therethrough; and
   a brake lining defining a wear surface, said brake lining matable with said convex brake shoe table outer surface, said brake lining material defining a plurality of brake lining drain openings therethrough, at least one of said plurality of brake lining drain openings aligned with one of said plurality of brake shoe table drain openings to provide an unobstructed moisture escape path between said cocave brake shoe table inner surface and said wear surface
   a pair of struts attached to said concave brake shoe table inner surface which define a concave trough therebetween, said plurality of brake shoe table drain openings located in communication with said concave trough.

5. The brake shoe assembly as recited in claim 4, wherein each of said plurality of brake shoe table drain openings and said plurality of brake lining drain openings are circular.

6. The brake shoe assembly as recited in claim 4, wherein each said plurality of brake shoe table drain openings and said plurality of brake lining drain openings are elongated.

7. A brake shoe assembly comprising:
   an arcuate brake shoe table defining a plurality of brake shoe table drain openings therethrough; and
   a brake lining matable with said arcuate brake shoe table, said brake lining material defining a plurality of brake lining drain openings therethrough, at least one of said plurality of brake lining drain openings aligned with one of said plurality of brake shoe table drain openings to provide an unobstructed moisture escape path wherein said unobstructed moisture escape path is unpressurized.

8. A brake shoe assembly comprising:
   an arcuate brake shoe table defining a plurality of brake shoe table drain openings therethrough; and
   a brake lining matable with said arcuate brake shoe table, said brake lining material defining a plurality of brake lining drain openings therethrough, at least one of said plurality of brake lining drain openings aligned with one of said plurality of brake shoe table drain openings to provide an unobstructed moisture escape path wherein said unobstructed moisture escape path is open to atmosphere on both ends.

9. A brake shoe assembly comprising:
   an arcuate brake shoe table defining a concave brake shoe table inner surface, a convex brake shoe table outer surface and a plurality of brake shoe table drain openings therethrough; and
   a brake lining defining a wear surface, said brake lining matable with said convex brake shoe table outer surface, said brake lining material defining a plurality of brake lining drain openings therethrough, at least one of said plurality of brake lining drain openings aligned with one of said plurality of brake shoe table drain openings to provide an unobstructed moisture escape path between said cocave brake shoe table inner surface and said wear surface, wherein said unobstructed moisture escape path is unpressurized.

10. A brake shoe assembly comprising:

an arcuate brake shoe table defining a concave brake shoe table inner surface, a convex brake shoe table outer surface and a plurality of brake shoe table drain openings therethrough; and a brake lining defining a wear surface, said brake lining matable with said convex brake shoe table outer surface, said brake lining material defining a plurality of brake lining drain openings therethrough, at least one of said plurality of brake lining drain openings aligned with one of said plurality of brake shoe table drain openings to provide an unobstructed moisture escape path between said cocave brake shoe table inner surface and said wear surface wherein said unobstructed moisture escape path is open to atmosphere on both ends.

11. A brake pad comprising:

a brake lining friction material matable with an arcuate brake shoe table, said brake lining material defining a plurality of brake lining drain openings therethrough, at least one of said plurality of brake lining drain openings aligned with at least one opening though said brake shoe table to provide an unpressurized unobstructed moisture escape path open to atmosphere on both ends though both the brake lining and the arcuate brake shoe table.

* * * * *